No. 621,516. Patented Mar. 21, 1899.
H. R. BESSELL.
DEVICE FOR SEPARATING WHITES AND YOLKS OF EGGS.
(Application filed July 13, 1898.)
(No Model.)
Fig. 1.
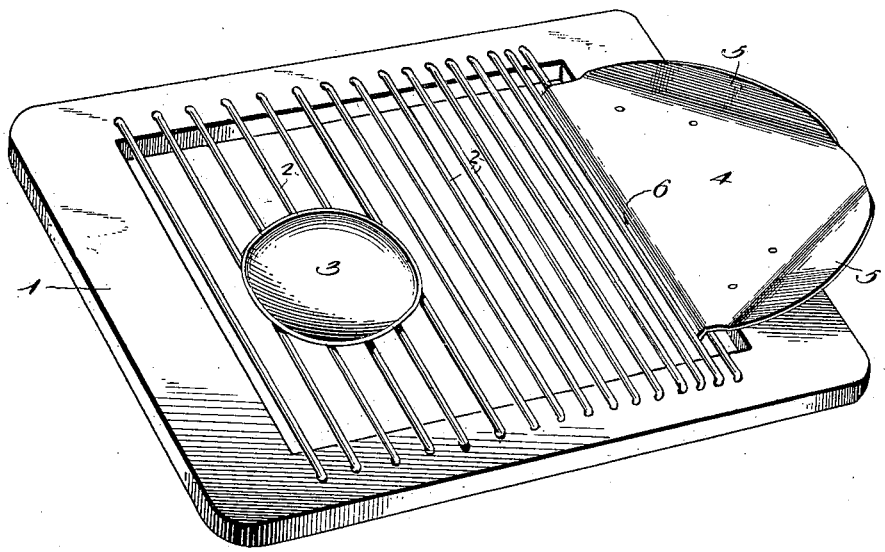
Fig. 2.
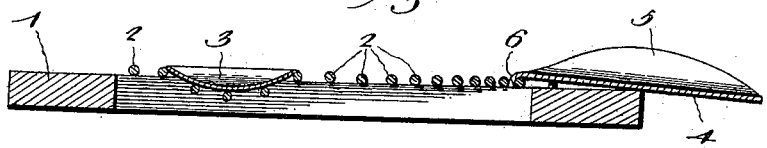
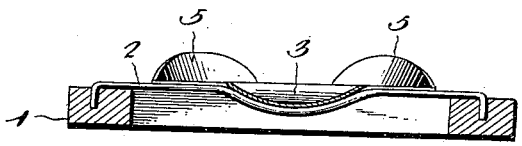
Fig. 3.
Witnesses
Henry R. Bessell, Inventor.
By his Attorneys,
C A Snow & Co.

UNITED STATES PATENT OFFICE.

HENRY ROBISON BESSELL, OF WAYLAND, ILLINOIS.

DEVICE FOR SEPARATING WHITES AND YOLKS OF EGGS.

SPECIFICATION forming part of Letters Patent No. 621,516, dated March 21, 1899.

Application filed July 13, 1898. Serial No. 685,848. (No model.)

*To all whom it may concern:*

Be it known that I, HENRY ROBISON BESSELL, a citizen of the United States, residing at Wayland, in the county of Schuyler and State of Illinois, have invented a new and useful Device for Separating Whites and Yolks of Eggs, of which the following is a specification.

The invention relates to improvements in devices for separating whites and yolks of eggs.

The object of the present invention is to improve the construction of devices for separating whites and yolks of eggs and to provide a simple, inexpensive, and efficient device adapted to be readily handled and capable of enabling the whites and yolks of eggs to be quickly separated and discharged into separate receptacles.

The invention consists in the construction and novel combination and arrangement of parts hereinafter fully described, illustrated in the accompanying drawings, and pointed out in the claims hereto appended.

In the drawings, Figure 1 is a perspective view of a device for separating whites and yolks of eggs constructed in accordance with this invention. Fig. 2 is a longitudinal sectional view. Fig. 3 is a transverse sectional view.

Like numerals of reference designate corresponding parts in all the figures of the drawings.

1 designates a rectangular frame, designed to be constructed of wood or any other suitable material, and the space within the frame is formed into a series of transverse openings by means of wires 2, extending across the frame and secured at their terminals to the sides of the same. The frame is designed to be supported upon a bowl or analogous receptacle in a horizontal position, and the whites of the eggs pass through the transverse openings, and an egg after it is broken is dropped into a dish or cup 3, supported by the wires 2 and having its upper edge arranged in substantially the same plane as the adjacent wires.

The wires which support the cup or dish 3 are depressed to form a seat for the same, and the said cup or dish, which may be constructed of sheet metal or any other suitable material, provides a concavity for the reception of an egg. The wires at the head of the frame are preferably about a half an inch apart, and the openings gradually decrease in width toward the foot of the frame.

Much of the white of an egg will flow over the sides of the dish or cup 3 and fall into the bowl or receptacle upon which the frame rests, and the white and yolk of an egg are quickly and thoroughly separated by raising the head of the frame and shaking it slightly to cause the yolk to roll slowly and gently down the frame to the foot of the same. The white of the egg will cling to the wires, which when the yolk is rolled in this manner will completely remove the white from it. The frame is provided at its bottom or foot with a spout 4, having outwardly-converging side flanges 5 and adapted to enable the yolk of an egg to be directed into a suitable receptacle. The spout 4 may, as illustrated in the accompanying drawings, be separate from the frame and consist of a plate of sheet metal secured to the frame and supported by the lowermost wire; but the construction may be varied and the spout can be constructed integral with the frame.

When the spout is separate from the frame, its inner edge portion is bent downwardly, as shown at 6, to overlap the supporting-wire and form a deflecting edge for the yolk to ride upon when passing from the separator on to the spout.

The invention has the following advantages: The device, which is simple, inexpensive, strong, and durable, is adapted to be conveniently handled, and it is capable of rapidly separating whites and yolks of eggs and of discharging the same into separate receptacles. The transverse openings of the frame permit the white of an egg to fall into a vessel which supports the frame, and by rolling the yolk from the concavity 3 to the spout it is thoroughly separated from the rest of the egg.

Changes in the form, proportion, and minor details of construction may be resorted to without departing from the spirit or sacrificing any of the advantages of this invention.

What I claim is—

1. An egg-separator comprising a frame having a series of transversely-disposed and spaced bars, an egg-receiving cup sustained by the bars and having its lip or discharge end in the same plane as the upper edges of the bars, and a spout sustained by the frame and located beyond the egg-cup and having its receiving portion disposed in the plane of the lip of said cup and the upper edges of said bars respectively, substantially as described.

2. An egg-separator comprising a frame, a series of transverse bars extending across the same, an egg-receiving cup sustained by the transverse bars and having its lip in the plane of the upper edges of said bars, a spout supported by the frame and having a deflected portion overlapping one of said bars, and the lower edge of said deflected portion being located below the plane of the upper edges of said bars, substantially as described.

3. A device of the class described, comprising a frame, a series of wires extending across the space within the frame and dividing the said space into a series of openings, a dish or cup arranged within the frame and supported by the said wires, the supporting-wires being depressed to form a seat for the dish or cup, and a spout arranged at the foot of the frame, substantially as described.

4. A device of the class specified comprising a frame, a series of wires extending transversely across the frame, and an egg-receiving cup and an egg-spout located in operative relation to said bars, and the discharge edge of the cup and the receiving edge of the spout being located in the plane of the upper edges of said bars, substantially as described.

5. A device of the class specified comprising a frame, a series of differentially-spaced wires extending transversely across the frame, and an egg-receiving cup and an egg-spout located in operative relation to said bars, and the discharge edge of the cup and the receiving edge of the spout being located in the plane of the upper edges of said bars, substantially as described.

In testimony that I claim the foregoing as my own I have hereto affixed my signature in the presence of two witnesses.

HENRY ROBISON BESSELL.

Witnesses:
 FRANK MANLOVE,
 THOS. A. HILLYER.